May 26, 1959  J. V. BURRIDGE  2,887,829
CENTERLESS GRINDERS
Filed March 14, 1958  2 Sheets-Sheet 1

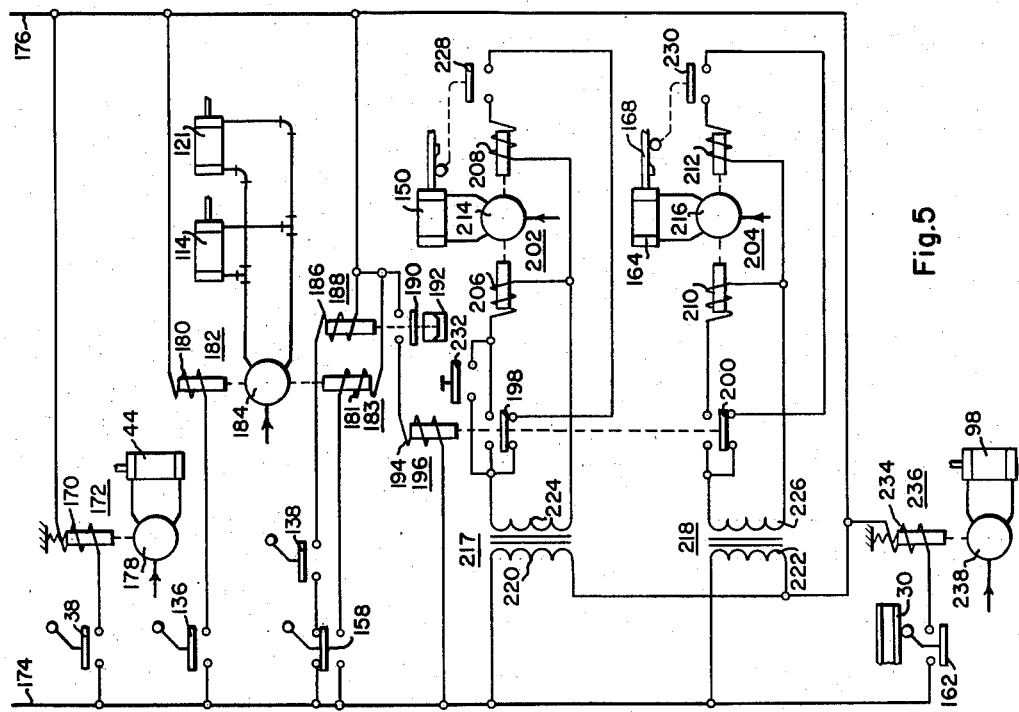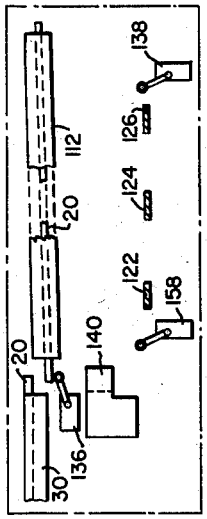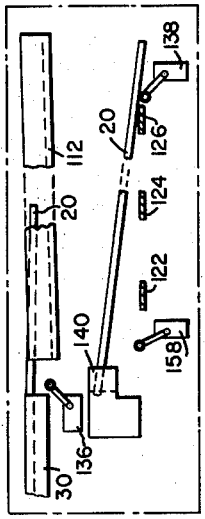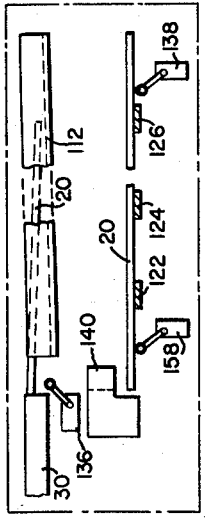

United States Patent Office 2,887,829
Patented May 26, 1959

2,887,829

CENTERLESS GRINDERS

Joseph V. Burridge, Bowmanville, Ontario, Canada, assignor to Allegheny Ludlum Steel Corporation, Brackenridge, Pa., a corporation of Pennsylvania Application March 14, 1958, Serial No. 721,553

11 Claims. (Cl. 51—103)

This invention relates to centerless grinders and in particular to centerless grinders having control equipment associated therewith for effecting a controlled operation thereof.

In present day production machinery, and in particular with respect to the art of centerless grinding, it is desired to maintain very close tolerances on work pieces such as rod, tube and the like on which work is performed by the centerless grinder. It has been quite difficult in the past to effect a satisfactory automatic control of the operation of centerless grinders, the control usually requiring a manual operation so as to maintain tolerances of the work pieces produced. Thus constant adjustment of the grinding wheels of centerless grinders has been required in order to compensate for the wear of the wheels so as to produce a work piece within the close tolerances desired.

An object of this invention is to provide for automatically adjusting a grinding wheel of a centerless grinder to compensate for wear of the grinding wheels of the centerless grinder and maintain finished dimensions of the work pieces being ground thereon within very close tolerances.

Another object of this invention is to provide means for gauging work pieces delivered from a centerless grinder and for effecting an adjustment of one of the grinding wheels of such grinder if the work piece exceeds a predetermined size.

A further object of this invention is to provide a centerless grinder having a fixed and a movable grinding regulating wheel and a carriage disposed to receive work pieces therefrom, the carriage having a switching member disposed to be actuated by each of the discharged work pieces and a gauge member disposed to receive each of such work pieces and pass it, if of less than a predetermined size, but to retain it if over the predetermined size, an adjusting means for effecting movement of the movable grinding regulating wheel, and means for effecting operation of the adjusting means when the switching member is actuated by the work piece, but only if the work piece is retained a predetermined period of time in the gauge member.

A further object of this invention is to provide a centerless grinder having a fixed and a movable grinding regulating wheel and a carriage disposed to receive a work piece therefrom, a carriage having a switching member disposed to be actuated by the discharged work piece and a gauge member disposed to receive such work piece and pass the work piece, if of less than a predetermined size, but to retain the work piece if over the predetermined size, an adjusting means for effecting movement of the movable grinding regulating wheel and actuating means for opening the gauge member, and means responsive when the switching member is actuated by the work piece and the work piece is retained a predetermined period of time in the gauge member, for effecting simultaneous operation of the adjusting means for adjusting the movable grinder and the actuating means for opening the gauge member to permit the gauge to pass the work piece therethrough.

Other objects of this invention will become apparent from the following description when taken in conjunction with the accompanying drawings in which:

Figs. 2, 3 and 4 are schematic representations of certain portions of the apparatus of Fig. 1 illustrating progressive operation thereof, and Fig. 5 is a diagrammatic view of the control systems and control apparatus utilized in conjunction with the apparatus of Fig. 1.

Figures 1, 1A:
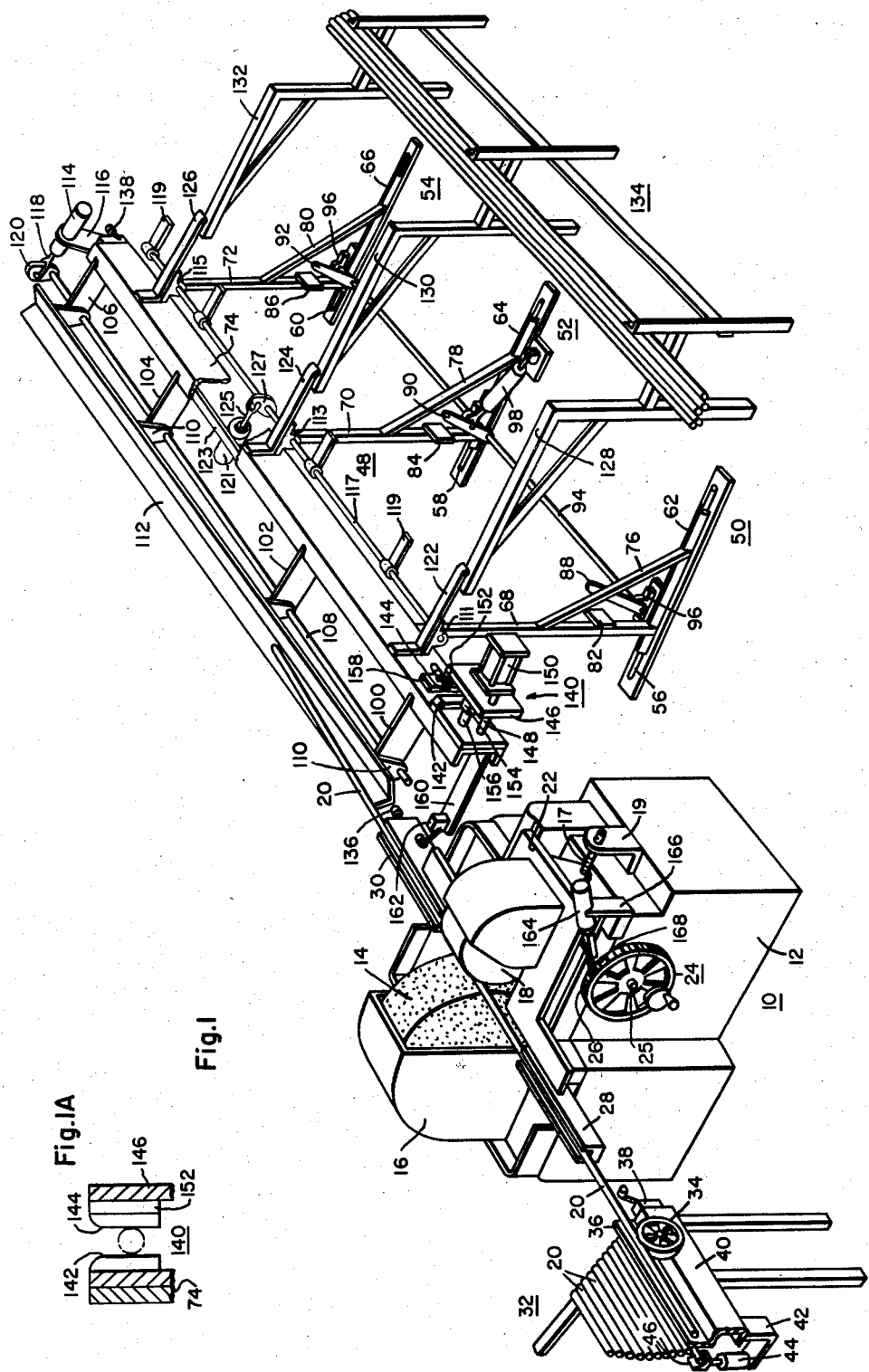
Figure 1 is a view in perspective of apparatus embodying features of this invention.
Fig. 1A is a view in elevation and partly in section, somewhat enlarged, of a gauge member utilized in the apparatus of Fig. 1.

Referring to the drawing, and in particular to Fig. 1 thereof, this invention is illustrated as being applied to a centerless grinder 10 of any of the well-known types. As is usual, the centerless grinder 10 is provided with a bed 12 on which a grinding wheel 14 having a fixed axis of rotation is suitably supported being partially covered as by means of a hood 16. The centerless grinder 10 is also provided with a grinding regulating wheel 18, the axis of which is movable with respect to the fixed axis grinding wheel 14 for adjusting the space therebetween and for controlling the amount of grinding performed on a work piece such as a rod 20 as it passes therethrough. The movable grinding regulating wheel 18 is usually carried on a pad 22 that is slidably mounted on the bed 12 for moving the wheel 18 with respect to the wheel 14. As in usual practice, the centerless grinder 10 is also provided with a screw feed 17 with the end of the shaft thereof extending through a bracket 19 to be driven by any suitable means for initially adjusting the positioning of the pad 22 and consequently the initial position of the grinding regulating wheel 18. A drive wheel 24 is also provided to make incremental adjustments in the position of the wheel 18 during an operation thereof. The drive wheel 24 is provided with tooth receiving pockets 26 about its perimeter to function as a ratchet for receiving a driving member or pawl as will be described hereinafter for effecting the incremental movement of the wheel 18 toward the fixed axis wheel 14. The drive wheel 24 has its shaft 25 extending through the bed and terminating in a worm feed (not shown) which meshes with a worm nut (not shown) disposed in threaded engagement with the screw feed 17 in a manner similar to that shown in Patent No. 1,976,111, issued October 9, 1934, in the name of Binn et al. whereby incremental movement of the drive wheel 24 will effect movement of the screw feed 17 and an incremental movement of the pad 22 and the grinding regulating wheel 18. Associated with the grinding regulating wheel 18 and movable therewith toward the fixed axis wheel 14 is a guide inlet channel 28 and a guide discharge channel 30 for guiding the work pieces 20 through the grinder 10. Such guides are usually welded to the end of the pad 22.

In the embodiment illustrated the work pieces 20 are carried on a suitably inclined rack 32, only a portion of which is shown and which is provided with a plurality of aligned feed wheels 34 at the lower edge thereof, only one of which is illustrated, a divider 36 being disposed between the supply of work pieces 20 held in the rack 32 and the wheels 34 which deliver the work piece 20 to the grinder. The wheels 34 are disposed along the lower edge of the rack 32 and are disposed to be simultaneously driven by any suitable means so as to be constantly rotating for supplying work pieces 20 continuously to the centerless grinder 10. Carried by the end of the rack 32 is a micro switch 38 disposed to be engaged by the rear end of one of the work pieces 20 as such work piece leaves and drops from the last wheel 34, the purpose of such microswitch 38 to be explained more fully hereinafter. The channel 40 of the rack 32 and on which the feed wheels 34 are mounted also carries a plurality of spaced brackets 42, only one of which is illustrated, on each of which is mounted an air cylinder 44 having a piston terminating in an angular shoe 46 disposed to be actuated upwardly to engage one of the work pieces 20 on the rack 32 to lift such work piece upwardly to a position where it will roll over the divider 36 and drop onto the aligned feed wheels 34 to be driven thereby toward the grinder 10.

At the discharge end of the centerless grinder 10 there is provided a carriage 48 for receiving the ground work pieces 20 as each work piece leaves the guide discharge channel 30. In this embodiment the carriage 48 is mounted on three footers 50, 52 and 54, each of which is provided with a fixed slide rod 56, 58 and 60, respectively, for receiving angle support base members 62, 64 and 66, respectively, of the carriage 48. The angle support base members 62, 64 and 66 each carries a vertical bar 68, 70 and 72, respectively, at the upper end of which a horizontal channel member 74 is secured as by welding. Suitable braces 76, 78 and 80 are disposed between the vertical bars and the angle support base members 68—62, 70—64 and 72—66, respectively, for supporting and maintaining the channel 74 in an operative position. As illustrated, each of the vertical bars 68, 70 and 72 is also provided with a plate 82, 84 and 86, respectively, disposed to extend outwardly therefrom into the path of movement of a rotatable arm 88, 90 and 92, respectively, that is fixed by mounting as by welding on a rod 94 rotatably mounted in suitable brackets such as 96 on each of the base angle support members 62, 64 and 66. The rotatable arms 88, 90 and 92 are disposed to be simultaneously driven through their fixed connection with the bar 94 when an air cylinder 98 and which has its piston rod connected to the rotatable arm 90 is actuated in a predetermined manner as will be described hereinafter.

The channel 74, forming the upper portion of the carriage 48, is provided with a plurality of inclined brackets 100, 102, 104 and 106 extending outwardly therefrom, the outer end of each of said brackets being provided with openings for receiving a rotatable rod 108 therein. The rotatable rod 108 is provided with a plurality of spaced brackets 110 extending outwardly therefrom and fixedly carried thereon such as by welding and which are disposed to carry an inclined trough or angle member 112 that is welded thereto and which is normally disposed for receiving the ground work pieces 20 as they are discharged from the grinder 10. In order to discharge the ground rods 20 from the trough member 112, an air cylinder 114 is carried on a suitable bracket 116 mounted on the end of the channel 74 and which is disposed with its piston 118 connected to a lever 120 fixedly carried on the end of the rod 108. Thus predetermined movement of the piston rod 118 will effect a rotation of the rod 108 and turn the trough 112 toward the channel 74 to discharge the work piece 20 from the trough 112 onto the upper edges of the brackets 100, 102, 104 and 106 and a reverse operation of the cylinder 114 will return the trough to its normal work receiving position. The ground work piece 20 will roll by gravity off the channel 74 toward downwardly sloped arms 122, 124 and 126 carried by the face of the channel 74 and disposed in overlapping relation with the arms 128, 130 and 132, respectively, of a rack 134 in which the ground rods 20 are collected.

As illustrated in Fig. 1, the sloped arms 122, 124 and 126 carry suitable bushings 111, 113 and 115 on the underside thereof through which a rotatable rod 117 extends, such rod being provided with a plurality of elongated fingers 119 disposed to be actuated from the substantially vertical position, the purpose of the fingers 119 of which will be described more fully hereinafter. In order to effect rotation of the rod 117 and consequently control the movement of the fingers 119, an air cylinder 121 is carried on a suitable bracket 123 mounted between the brackets 102 and 104 or at any other convenient place on the carriage 48. The piston 125 of the air cylinder 121 is connected to a lever 127 fixedly carried by the rod 117. Thus predetermined movement of the piston rod 123 will effect a rotation of the rod 117 and turn the fingers 119 to a vertical position and the reverse operation of the air cylinder 121 will return the fingers 119 to their horizontal position. In practice the air cylinders 114 and 121 are disposed to be simultaneously operated to effect simultaneous tilting operation of the trough 112 and a movement of the fingers 119 to the vertical position or a simultaneous return of the trough 112 to its rod receiving position and the return of the fingers 119 to the horizontal position.

In order to control the simultaneous operation of the air cylinders 114 and 121 to effect a tilting operation of the trough 112 and move the fingers 119 to a vertical position, a microswitch 136 is carried at the lower edge of the guide discharge trough 30 to be engaged by the rear end of the ground rod discharged from the guide 30 as the rod falls into the trough 112. The switch 136 is connected as will be described hereinafter to control the operation of the air cylinders 114 and 121 in a given direction. Another switch 138 is carried by the channel member 74 disposed to be engaged by a portion of the ground work piece 20 as the work piece rolls and approaches the sloped arms 122, 124 and 126. The switch 138 can be positioned at different points along the channel 74 depending upon the length of the piece on which work is performed or a number of switches 138 disposed in spaced relation and connected in parallel circuit relation may be used so that one of such switches will always be contacted as the work piece moves toward the arms 122, 124 and 126. At the opposite end of the channel member 74 a gauge member 140 is disposed for receiving an end of the ground work piece 20 as it rolls toward the arms 122, 124 and 126. In this embodiment the gauge member 140 is provided with a fixed gauge face 142 and a retractable gauge face 144. Both gauge faces are preferably of some hard non-deformable material such as, for example, tungsten carbide. The retractable gauge face 144 is carried on a plate 146 that is slidably mounted on a rod 148 extending outwardly from the channel 74. An air cylinder 150 is suitably mounted on the end of the rod 148 and has its piston connected to effect movement of the plate 146 and thereby effect movement of the retractable gauge face 144 relative to the fixed gauge face 142. In practice the predetermined gauge size of the gauge member 140 is determined by the size of a shim 152 placed behind the retractable gauge face 144, different sized shims 152 being employed depending upon the predetermined size of the ground work piece that is to be maintained. The plate 146 is provided with a block 154 disposed to seat against a fixed stop 156 carried by the plate on which the fixed gauge face 142 is mounted so that on a closing movement of the plate 146 a positive stop is provided and a given gauge will be obtained, depending upon the size of the shim 152 utilized.

Associated with the gauge member 140 and disposed below the level of the gauge faces in which a work piece of greater than the predetermined size will be held is a microswitch 158 disposed to be engaged by the ground work piece as the work piece passes through the gauge member 140. The purpose of the microswitch 158 will be referred to more fully hereinafter.

The channel member 74 also carries a bracket 160 at its end adjacent the grinder 10, such bracket 160 being disposed to carry a microswitch 162 at its outer end disposed in contact relation with the guide discharge member 30 and disposed to be actuated to a circuit establishing position as the guide discharge member moves away therefrom for controlling the operation of the air cylinder 98, as will be described more fully hereinafter, for effecting alignment of the trough 112 with the guide discharge member 30.

In order to control incremental movement of the grinder regulating wheel 18 relative to the fixed wheel 14, an air cylinder 164 is carried on a suitable bracket 166 on the bed 12 of the grinder 10 with the piston (not shown) of such air cylinder disposed to drive a tooth arm 168 to engage one of the pockets 26 of the wheel 24 to thereby move the wheel 24 in a counter clockwise direction a predetermined distance to move the axis of the grinding regulating wheel 18 toward the fixed axis wheel 14. The air cylinder 164 has a switch member 230 (shown in Fig. 5) associated therewith and disposed to be engaged as the tooth arm 168 reaches its limit of movement imparted by the air cylinder 164. Likewise, the air cylinder 150 has a switch 228 (shown in Fig. 5) associated therewith and disposed to be engaged as the plate 146 is actuated to its farthest retractable position. The purpose of such switches associated with the air cylinders 164 and 150 will be described more fully in reference to the diagrammatic view of the control circuits and apparatus of this invention.

Referring to Figs. 2, 3 and 4, there is a representation of the movement of a ground work piece 20 when it is first delivered to the inclined tough 112 with the end of the ground work piece engaging the microswitch 136 (see Fig. 2) followed by a showing of the work piece 20 progressed to the position where (see Fig. 3) a portion thereof engages the microswitch 138 and the opposite end thereof is retained in the gauge member 140 to the position illustrated (see Fig. 4) where the ground work piece 20 has passed through the gauge 140 and is in a position to actuate both of the switches 158 and 138.

Referring to Fig. 5, circuits and control apparatus previously referred to are diagrammatically illustrated. Thus the switch 38 is illustrated disposed for movement to a circuit establishing position to connect the winding 170 of an electromagnet 172 across a power source represented by conductors 174 and 176. The electromagnet 172 is connected when energized to control the operation of an air valve 178 to admit air to the lower portion of the air cylinder 44 whereby the cylinder 44 effects a movement of the inclined shoe 46 to lift a rod 20 over the divider 36 and deposit said rod on the revolving feed wheels 34. Movement of the end of the work piece 20 beyond the contacting portion of the switch 38 permits the switch 38 to return to its circuit interrupting position where the electromagnet 172 is de-energized and the spring biased solenoid thereof actuates the air valve 178 to deliver air to the other end of the air cylinder 114 to retract the piston thereof and consequently lower the inclined lifting shoe 46 controlled thereby.

Likewise, the switch 136 is disposed to be actuated to a circuit establishing position when the ground work piece 20 leaves the guide 30 to connect the energizing windings 180 of electromagnet 182 across the power conductors 174 and 176 and thereby actuate an air valve 184 which controls the flow of air to the upper end of the cylinders 114 and 121 to retract the piston rods thereof and effect a simultaneous tilting operation of the trough 112 to discharge a ground work piece therefrom and turn the fingers 119 to a vertical position. The fingers 119 thus function to maintain the ground work piece in alignment with the gauge member 140 to be gauged thereby. As the ground work piece is removed from switch 136, the energizing circuit for electromagnet 182 is interrupted but a reverse operation of the air cylinders 114 and 121 will not be effected until switch 158 is actuated.

As referred to hereinbefore, the switch 158 is only contacted after a work piece 20 passes through the gauge member 140, whereas switch 138 is contacted immediately by the work piece as the work piece 20 rolls toward the arms 122, 124 and 126. Such switches 158 and 138 are disposed to control the energizing circuit for the energizing windings 186 of a time delay electromagnet and relay 188 and the switch 158 also controls the energizing circuit for the energizing windings 181 of electromagnet 183 by controlling the connection thereof across the power conductors 174 and 176. The time delay relay 188 may be of any suitable type and in this embodiment is illustrated as being provided with a contact member 190 and a suitable dash pot 192 for effecting time delay in the operation of the contact member 190 to a circuit establishing position. The contact member 190 is disposed to control the energizing circuit for the energizing winding 194 of contactor 196 across the power conductors 174 and 176. The contactor 196 is provided with a pair of contact members 198 and 200 disposed to be actuated to control the operation of air valves 202 and 204, respectively, which are associated with the air cylinders 150 and 164, respectively.

The air valves 202 and 204, as well as air valve 184, are each of the type known as 4-way 2-position, double solenoid, momentary contact type electric valves, although it will be appreciated that any other suitable type electric valve can be utilized. In the embodiment illustrated each of the air valves 202 and 204 is provided with a pair of opposed electromagnets 206—208 and 210—212, respectively, disposed to control the operation of the valves 214 and 216, respectively, for controlling the operation of the cylinders 150 and 164, respectively. In order to provide a suitable source of power supply for the electromagnets of the air valves 202 and 204, two transformers 217 and 218 are provided having the primary windings 220 and 222, respectively, thereof connected across the power conductors 174 and 176 with the secondary windings 224 and 226, respectively, being disposed to be connected by operation of the contactor 196 in a predetermined manner to the energizing windings of the electromagnets. Thus the contact members 198 and 200 of contactor 196 are disposed to connect the energizing windings of electromagnets 208 and 212, respectively, when the contactor 196 is de-energized and to connect the energizing windings of electromagnets 206 and 210, respectively, to the secondary windings 224 and 226, respectively, of the transformers 217 and 218, respectively, when the contactor 196 is energized.

As referred to hereinbefore, each of the air cylinders 150 and 164 is provided with a switch disposed to be actuated under predetermined operating conditions to establish energizing circuits for controlling the operation of such air cylinders. Thus, as shown in Fig. 5, a switch 228 is disposed to be actuated by the piston rod of the cylinder 150 or by the plate 146 supporting part of the gauge member when the retractable gauge face 144 has been retracted to its utmost position to cooperate with the switch member 198 of contactor 196 to establish the energizing circuit for the energizing winding of electromagnet 208. Likewise, a switch 230 is associated with the cylinder 164, being disposed to be operated to a circuit interrupting position as the tooth arm 168 reaches its utmost outer position whereby the switch 230 cooperates with the contact member 200 of contactor 196 to establish an energizing circuit for the energizing winding of electromagnet 212. In addition to the control effected by the contact member 198 of contactor 196, a manually operated switch 232 is disposed for operation to a circuit establishing position for manually controlling the energization of the energizing winding of electromagnet 206.

The microswitch 162 carried by the carriage 74 is disposed to be operated to a circuit establishing position upon predetermined movement of the guide member 30 away from the switch 162 to connect the energizing winding 234 of an electromagnet 236 across the power conductors 174 and 176 to control the operation of an air valve 238 and thereby control the operation of the cylinder 98 to move the carriage 48. Thus as the guide member 30 moves away from the switch 162, the switch 162 is actuated to a circuit establishing position and electromagnet 236 is energized to operate the air valve 238 to admit air to the lower portion of the cylinder 98 to actuate its piston rod and consequently the levers 88, 90 and 92 to engage the plates 82, 84 and 86, respectively, and slidably move the carriage 48 on the slide rods 56, 58 and 60. As the carriage is moved forward, the switch 162 again contacts the guide member 30 to effect a circuit interrupting movement of the switch 162 whereby the electromagnet 236 is de-energized and its spring biased solenoid effects the operation of the air valve 238 to deliver air to the other end of air cylinder 98 to retract the piston and release pressure from the carriage.

In operation, assuming that the work pieces 20 to be ground are rods, a rod 20 is fed as by means of the driven feed wheels 34 to the centerless grinder 10 where the rod is operated on by the preset rotating grinding wheels 14 and 18 and is progressively advanced therethrough and delivered through the discharge guide member 30 to the inclined trough 112 of the carriage 48. As a rod 20 leaves the feed wheels 34, the end thereof contacts switch 38 to effect an operation thereof to energize the electromagnet 172 and thereby effect an operation of the air cylinder 44 to lift another one of the rods 20 from the rack 32 and deposit it on the feed wheels 34 where it is fed forward to a position where the end of the following rod abuts the end of the rod being ground in the grinder 10. As a ground rod is discharged from the grinding wheels 14 and 18, the end of the following rod continues to abut the end of the ground rod and force it through the guide member 30 to a position where the rear end of the ground rod 20 clears the guide member 30 and drops into the inclined trough 112 where the rear end of the ground rod 20 engages switch 136.

When the switch 136 is thus engaged, it is actuated to a circuit establishing position to energize the windings 180 of the electromagnet 182 to control the operation of the air valve 184 in a predetermined direction to admit air to the cylinders 114 and 121 to effectively impart a clockwise motion to the rod 108 to tilt the trough 112 and discharge the ground rod therefrom and effect movement of the rod 117 to move the fingers 119 to the vertical position. When the ground rod 20 is moved to a position where the rear end thereof is free from the switch 136, the switch 136 is returned to a circuit interrupting position and the electromagnet 182 is de-energized. As the ground rod rolls down the arms 100, 102, 104 and 106 and drops toward the inclined arms 122, 124 and 126 carried by the channel 74 of the carriage 48, an end portion of the ground rod contacts and actuates switch 138 to a circuit establishing position. At the same time, the fingers 119 being in their vertical position prevents the ground rod from rolling down the arms 122, 124 and 126 and maintains the ground rod in alignment with the gauge member 140. Switch 138 cooperates with switch 158 to establish the energizing circuit for time delay relay 188 whereby relay 188 tends to actuate its contact member 190 to a circuit establishing position, but the dash pot 192 provides a time delay in such a circuit establishing operation. With an end portion of the ground rod 20 on switch 138, the other end of the ground rod drops onto the gauge member 140 and, if the rod has a diameter less than the predetermined limit established by the gauge, will pass directly through the gauge member to contact switch member 158 and actuate such switch member to interrupt the energization of relay 188 and prevent a continued movement of its contact member 190 to a circuit establishing position and to also establish the energizing circuit for the windings 181 of electromagnet 183 to operate the air valve 184 in a direction to effect a reverse operation of air cylinders 114 and 121. If the ground rod 20, however, is in excess of the predetermined size, as determined by the gauge member 140, the ground rod will be held in the gauge member 140 until the relay 188 controlled by the switch 138 is energized a sufficient period of time as determined by the time delay of such relay to effect a circuit establishing movement of its contact member 190 to effectively energize contactor 196.

When contactor 196 is energized, its contact members 198 and 200 are moved upwardly to establish the energizing circuits for electromagnets 206 and 210 associated with air valves 202 and 204, respectively. When contact member 200 is in its upper circuit establishing position and the winding of electromagnet 210 is energized, the air valve 204 is operated to effect an operation of the cylinder 164 to drive the tooth arm 168 outwardly and effect an incremental movement of the wheel 24 to thereby effect an incremental movement of the pad 22 and consequently the axis of the grinding wheel 18 toward the fixed axis of the grinding wheel 14.

At the same time contact member 198 has effectively established the energizing circuit of electromagnet 206 to actuate the valve 214 to a position where air is admitted to the cylinder 150 to effect a movement of the retractable gauge face 144 away from the fixed gauge face 142 of the gauge member 140 and permit the ground rod 20 to pass therethrough where it engages the switch 158 to interrupt the energizing circuit to the time delay relay 188 and effectively energize electromagnet 183. Electromagnet 183 is thus actuated to operate valve 184 to admit air to the opposite ends of cylinders 114 and 121 whereby the trough 112 is returned to its work receiving position and the fingers 119 are turned to their horizontal position to permit the ground rod to roll down arms 122, 124 and 126. When the time delay relay 188 is de-energized contactor 196 is de-energized to return the contact members 198 and 200 thereof to their de-energized position where they are in circuit establishing position with respect to electromagnets 208 and 212, respectively, of the air valves 202 and 204, respectively.

As the air cylinder 164 is actuated to drive the tooth arm 168 to its utmost position, contact member 230 is actuated to a circuit establishing position for cooperating with contact member 200 whereby the energizing winding of electromagnet 212 is energized to effect operation of air valve 216 to deliver air to the cylinder 164 to effectively retract the tooth arm 168 to a position where it is ready for another operation.

Simultaneously with the reverse operation of the air cylinder 164, the operation of the air cylinder 150 to effect an opening movement of the gauge member 140 is continued to the point where switch member 228 is engaged and actuated to a circuit establishing position for cooperating with contact member 198 to establish the energizing circuit for electromagnet 208 whereby the air valve 214 is operated to deliver air to the cylinder 150 to thereby effect a forward movement of the plate 146 and return the retractable gauge face 144 to its predetermined gauge relation with the fixed gauge face 142 whereby the gauge member 140 is reset to the initially determined gauge for receiving the next discharged ground bar.

As the ground bars pass through the gauge member 140, they roll down the inclined arms 122, 124 and 126 of the carriage 48 to the aligned arms 128, 130 and 132, respectively, of the rack 134 and into such rack where they are stored until a supply of the ground bars is accumulated. As the ground bars are continuously discharged from the grinder 10, it will be appreciated that the grinding wheels 14 and 18 wear with the result that the bars tend to exceed the predetermined gauge limits. Thus, as the bars reach or exceed the predetermined gauge limits, the apparatus of this invention effects an adjustment of the position of the grinding regulating wheel 18 with respect to the fixed axis wheel 14 in direct proportion to the amount of wear of the grinding wheels. At the same time it will be appreciated that as an adjustment is made, even though in increments of the axis of the grinding regulating wheel 18 with respect to the fixed axis of the grinding wheel 14, unless the carriage 48 is moved as the pad 22 is moved, the carriage will not be maintained in alignment with the discharge guide member 30 and difficulties will be encountered in the automatic handling of the discharged ground rod.

Thus, as the guide discharge member 30 moves with the grinding regulating wheel 18 toward the grinding wheel 14, the switch 162 is operative to control the energization of electromagnet 236 to control the operation of the air valve 238 and control the operation of the air cylinder 98 to move the arms 88, 90 and 92 into pressure engagement with the plates 82, 84 and 86, respectively. As pressure is thus applied to the plates 82, 84 and 86, the carriage 48 slides on the fixed slide rods of the footers 50, 52 and 54, such sliding movement of the carriage 48 being in increments in direct response to the movement of the pad 22 and the regulating wheel 18 and the discharge guide member 30 to thereby maintain the trough 112 in alignment with the guide member 30.

In practice it will be appreciated that the rods being ground are never ground under size, but because of the wear of the grinding wheels will always tend to be ground toward the upper limit of the tolerances permitted. For this reason, the apparatus and controls described hereinbefore are very effective for the continuous production of precision ground work pieces from the centerless grinder. Tolerances in the neighborhood of .0001 inch are obtained in the ground work pieces without any manual operations being necessary. The entire operation, with the exception of loading a supply of work pieces to be ground on the rack 32 and the removal of the ground work pieces from the rack 134, is automatic and such automatic control is effected when a predetermined maximum gauge is reached, but only after adequate time delay to permit a ground rod to pass through the gauge member 140 if the ground rod is within tolerances.

The apparatus and controls of this invention are formed of substantially standard components and do not entail the expenditure of considerable monies in effecting close controls. The equipment described embodying the features of this invention can be readily reproduced by anyone skilled in the art.

I claim:

1. The combination with a centerless grinding machine including a fixed grinding wheel and a movable regulating wheel for grinding rods and the like and having a work receiving surface disposed adjacent thereto, switching means disposed in the path of movement of said rod to be actuated thereby to effect a switching operation as said rod passes to said work receiving surface, a gauge member disposed to receive a portion of said rod as the rod passes to the work receiving surface, the gauge member having relatively movable members normally positioned to provide a predetermined gauge size to retain the rod therein if said rod exceeds a predetermined diameter size or to pass the rod onto said work receiving surface if said rod does not exceed said predetermined diameter size, actuating means disposed for operation to effect the opening of said relatively movable members of said gauge member, actuating means disposed for operation to effect a predetermined movement of the regulating grinding wheel toward the fixed grinding wheel, time delay means connected to be responsive to the operation of said switching means and disposed for operation after a predetermined time interval to effect the simultaneous operation of said gauge and regulating wheel actuating means to effect the opening of the movable members of said gauge member and pass the rod retained therein therethrough and effect a predetermined movement of the regulating wheel toward the fixed grinding wheel, and switching means associated with each of said actuating means and disposed to be operated by said operation thereof to effect a reverse operation of each of said actuating means to return said actuating means to their initial positions and close the movable members of said gauge member to the predetermined gauge size.

2. The combination with a centerless grinding machine including a fixed grinding wheel and a movable regulating wheel for grinding rods and the like and having a work receiving surface disposed adjacent thereto, switching means disposed in the path of movement of said rod to be actuated thereby to effect a switching operation as said rod passes to said work receiving surface, a gauge member disposed to receive a portion of said rod as the rod passes to the work receiving surface, the gauge member having relatively movable members normally positioned to provide a predetermined gauge size to retain the rod therein if said rod exceeds a predetermined diameter size or to pass the rod onto said work receiving surface if said rod does not exceed said predetermined diameter size, means disposed in the path of movement of said rod as it passes to said work receiving surface to restrain said rod and maintain said rod in alignment with said gauge member until said rod passes through said gauge member, actuating means disposed for operation to effect the opening of said relatively movable members of said gauge member, actuating means disposed for operation to effect a predetermined movement of the regulating grinding wheel toward the fixed grinding wheel, time delay means connected to be responsive to the operation of said switching means and disposed for operation after a predetermine time interval to effect the simultaneous operation of said gauge and regulating wheel actuating means to effect the opening of the movable members of said gauge member and pass the rod retained therein therethrough and effect a predetermined movement of the regulating wheel toward the fixed grinding wheel, and switching means associated with each of said actuating means and disposed to be operated by said operation thereof to effect a reverse operation of each of said actuating means to return said actuating means to their initial positions and close the movable members of said gauge member to the predetermined gauge size.

3. The combination with a centerless grinding machine including a fixed grinding wheel and a movable regulating wheel for grinding rods and the like and having a work receiving surface disposed adjacent thereto for receiving a ground rod therefrom, switching means associated with said work receiving surface disposed in the path of movement of said rod to be actuated thereby to effect a switching operation as said rod passes to said work receiving surface, a gauge member disposed to receive a portion of said rod as the rod passes to the work receiving surface, the gauge member having a predetermined gauge size and being disposed to retain the rod therein if said rod exceeds a predetermined diameter size or to pass the rod onto the work receiving surface if said rod does not exceed said predetermined diameter size, the gauge member having a fixed portion and a retractable portion, the retractable portion being disposed to be actuated to open the gauge member to pass the bar retained therein onto said work receiving surface, actuating means disposed for operation to effect movement of said retractable portion relative to the fixed portion, actuating means disposed for operation to effect a predetermined movement of the regulating grinding wheel toward the fixed grinding wheel, time delay means connected to be responsive to the operation of said switching means and disposed for operation after a predetermined time interval to effect the simultaneous operation of said gauge and regulating wheel actuating means to thereby effect movement of the retractable portion of the gauge member to open the gauge member and pass the rod retained therein therethrough and to effect said predetermined movement of the regulating wheel toward the fixed grinding wheel, and switching means associated with each of said actuating means and disposed to be operated by said operation thereof to effect a reverse operation of each of said actuating means to return each of said actuating means to its initial position and move the retractable portion of said gauge member toward the fixed portion to reestablish the predetermined gauge size.

4. The combination with a centerless grinding machine including a fixed grinding wheel and a movable regulating wheel for grinding rods and the like and having a work receiving surface disposed adjacent thereto for receiving a ground rod therefrom, switching means associated with said work receiving surface disposed in the path of movement of said rod to be actuated thereby to effect a switching operation as said rod passes to said work receiving surface, a gauge member disposed to receive a portion of said rod as the rod passes to the work receiving surface, the gauge member having a predetermined gauge size and being disposed to retain the rod therein if said rod exceeds a predetermined diameter size or to pass the rod onto the work receiving surface if said rod does not exceed said predetermined diameter size, the gauge member having a fixed portion and a retractable portion, the retractable portion being disposed to be actuated to open the gauge member to pass the bar retained therein onto said work receiving surface, means disposed in the path of movement of said rod as it passes to said work receiving surface to restrain said rod and maintain said rod in alignment with said gauge member until said rod passes through said gauge member, actuating means disposed for operation to effect movement of said retractable portion relative to the fixed portion, actuating means disposed for operation to effect a predetermined movement of the regulating grinding wheel toward the fixed grinding wheel, time delay means connected to be responsive to the operation of said switching means and disposed for operation after a predetermined time interval to effect the simultaneous operation of said gauge and regulating wheel actuating means to thereby effect movement of the retractable portion of the gauge member to open the gauge member and pass the rod retained therein therethrough and to effect said predetermined movement of the regulating wheel toward the fixed grinding wheel, and switching means associated with each of said actuating means and disposed to be operated by said operation thereof to effect a reverse operation of each of said actuating means to return each of said actuating means to its initial position and move the retractable portion of said gauge member toward the fixed portion to reestablish the predetermined gauge size.

5. The combination with a centerless grinding machine including a fixed grinding wheel and a movable regulating wheel for grinding rods and the like and having guide means at the discharge end of the machine, a carriage having a work receiving surface disposed adjacent said guide means for receiving a ground rod therefrom, switching means carried by said carriage and disposed in the path of movement of said rod to be actuated thereby to effect a switching operation as said rod passes to said work receiving surface, a gauge member carried by said carriage disposed to receive a portion of said rod as the rod passes to the work receiving surface, the gauge member having a predetermined gauge size and being disposed to retain the rod therein if said rod exceeds a predetermined diameter size or to pass the rod onto the work receiving surface if said rod does not exceed said predetermined diameter size, the gauge member having a fixed portion and a retractable portion, the retractable portion being disposed to be actuated to open the gauge member to pass the bar retained therein onto said work receiving surface, actuating means disposed for operation to effect movement of said retractable portion relative to the fixed portion, actuating means disposed for operation to effect a predetermined movement of the regulating grinding wheel toward the fixed grinding wheel, time delay means connected to be responsive to the operation of said switching means and disposed for operation after a predetermined time interval to effect the simultaneous operation of said gauge and regulating wheel actuating means to thereby effect movement of the retractable portion of the gauge member to open the gauge member and pass the rod retained therein therethrough and to effect said predetermined movement of the regulating wheel toward the fixed grinding wheel, and switching means associated with each of said actuating means and disposed to be operated by said operation thereof to effect a reverse operation of each of said actuating means to return each of said actuating means to its initial position and move the retractable portion of said gauge member toward the fixed portion to reestablish the predetermined gauge size.

6. The combination with a centerless grinding machine including a fixed grinding wheel and a movable regulating wheel for grinding rods and the like and having guide means at the discharge end of the machine movable with the regulating wheel, a movable carriage having a work receiving surface disposed adjacent said guide means for receiving a ground rod therefrom, means disposed to be operated to effect a predetermined movement of said carriage in a predetermined direction, switching means carried by said carriage and disposed in the path of movement of said rod to be actuated thereby to effect a switching operation as said rod passes to said work receiving surface, a gauge member carried by said carriage disposed to receive a portion of said rod as the rod passes to the work receiving surface, the gauge member having a predetermined gauge size and being disposed to retain the rod therein if said rod exceeds a predetermined diameter size or to pass the rod onto the work receiving surface if said rod does not exceed said predetermined diameter size, the gauge member having a fixed portion and a retractable portion, the retractable portion being disposed to be actuated to open the gauge member to pass the bar retained therein onto said work receiving surface, actuating means disposed for operation to effect movement of said retractable portion relative to the fixed portion, actuating means disposed for operation to effect a predetermined movement of the regulating grinding wheel toward the fixed grinding wheel, time delay means connected to be responsive to the operation of said switching means and disposed for operation after a predetermined time interval to effect the simultaneous operation of said gauge and regulating wheel actuating means to thereby effect movement of the retractable portion of the gauge member to open the gauge member and pass the rod retained therein therethrough and to effect said predetermined movement of the regulating wheel towards the fixed grinding wheel, switching means associated with each of said actuating means and disposed to be operated by said operation thereof to effect a reverse operation of each of said actuating means to return each of said actuating means to its initial position and move the retractable portion of said gauge member toward the fixed portion to reestablish the predetermined gauge size, and another switching means disposed to be operated by a predetermined movement of said guide means, said another switching means being connected to control the operation of the carriage movement means in response to a predetermined movement of said guide means to effect a corresponding predetermined movement of said carriage to maintain said carriage in alignment with the guide discharge means for receiving a ground rod therefrom.

7. The combination with a centerless grinding machine including a fixed grinding wheel and a movable regulating wheel for grinding rods and the like and having guide means at the discharge end of the machine, a carriage disposed adjacent said guide means, a movable guide supporting member carried by the carriage disposed to receive a ground rod as the rod is discharged from the guide means, means disposed to be actuated when the ground rod is carried only by said guide supporting member to effect movement of said guide member to discharge the rod therefrom, a work receiving surface on said carriage for receiving the rod discharged from said guide supporting member, switching means carried by said carriage and disposed in the path of movement of said rod as said rod is discharged from said guide supporting member whereby the switching means is engaged and operated by said rod, a gauge member carried by said carriage disposed to receive a portion of said rod when the rod is discharged from said guide supporting member, the gauge member having a predetermined gauge size and being disposed to retain the rod therein if said rod exceeds a predetermined diameter size or to pass the rod onto the work receiving surface if said rod does not exceed said predetermined diameter size, the gauge member having a fixed portion and a retractable portion, the retractable portion being disposed to be actuated to open the gauge member to pass a rod retained therein onto said work receiving surface, actuating means disposed for operation to effect movement of said said retractable portion relative to the fixed portion, actuating means disposed for operation to effect a predetermined movement of the regulating grinding wheel toward the fixed grinding wheel, time delay means connected to be responsive to the operation of said switching means and disposed for operation after a predetermined time interval to effect operation of said gauge and regulating wheel actuating means to thereby effect movement of the retractable portion of the gauge member to open the gauge member and pass a rod retained therein therethrough and to effect said predetermined movement of the regulating wheel toward the fixed grinding wheel, and means responsive to said operation of each of said actuating means to effect a reverse operation thereof to return each of said actuating means to its initial position and move the retractable portion of said gauge member toward the fixed portion to reestablish the predetermined gauge size.

8. The combination with a centerless grinding machine including a fixed grinding wheel and a movable regulating wheel for grinding rods and the like and having guide means at the discharge end of the machine, a carriage disposed adjacent said guide means, a movable guide supporting member carried by the carriage disposed to receive a ground rod as the rod is discharged from the guide means, means disposed to be actuated when the ground rod is carried only by said guide supporting member to effect movement of said guide member to discharge the rod therefrom, a work receiving surface on said carriage for receiving the rod discharged from said guide supporting member, switching means carried by said carriage and disposed in the path of movement of said rod as said rod is discharged from said guide supporting member whereby the switching means is engaged and operated by said rod, a gauge member carried by said carriage disposed to receive a portion of said rod when the rod is discharged from said guide supporting member, the gauge member having a predetermined gauge size and being disposed to retain the rod therein if said rod exceeds a predetermined diameter size or to pass the rod onto the work receiving surface if said rod does not exceed said predetermined diameter size, means disposed to be actuated simultaneously with the discharge of the rod from said guide supporting member to restrain movement of the rod and maintain the rod in alignment with the gauge member until the rod passes through the gauge member, the gauge member having a fixed portion and a retractable portion, the retractable portion being disposed to be actuated to open the gauge member to pass a rod retained therein onto said work receiving surface, actuating means disposed for operation to effect a predetermined movement of the regulating grinding wheel toward the fixed grinding wheel, time delay means connected to be responsive to the operation of said switching means and disposed for operation after a predetermined time interval to effect operation of said gauge and regulating wheel actuating means to thereby effect movement of the retractable portion of the gauge member to open the gauge member and pass a rod retained therein therethrough and to effect said predetermined movement of the regulating wheel toward the fixed grinding wheel, and means responsive to said operation of each of said actuating means to effect a reverse operation thereof to return each of said actuating means to its initial position and move the retractable portion of said gauge member toward the fixed portion to reestablish the predetermined gauge size.

9. The combination with a centerless grinding machine including a fixed grinding wheel and a movable regulating wheel for grinding rods and the like and having guide means at the discharge end of the machine movable with the regulating wheel, a movable carriage disposed adjacent said guide means, means disposed to be operated to effect a predetermined movement of said carriage in a predetermined direction, a movable guide supporting member carried by said carriage disposed to receive a ground rod as the rod is discharged from the guide means, means disposed to be actuated when the ground rod is carried only by said guide supporting member to effect movement of said guide member to discharge the rod therefrom, a work receiving surface on said carriage for receiving the rod discharged from said guide supporting member, a switching means carried by said carriage and disposed in the path of movement of said rod as said rod is discharged from said guide supporting member whereby the switching means is operated when engaged by said rod, a gauge member carried by said carriage disposed to receive a portion of said rod when the rod is discharged from said guide supporting member, the gauge member having a predetermined gauge size and being disposed to retain the rod therein if said rod exceeds a predetermined diameter size or to pass the rod onto the work receiving surface if said rod does not exceed said predetermined diameter size, the gauge member having a fixed portion and a retractable portion, the retractable portion being disposed to be actuated to open the gauge member to pass a bar retained therein onto said work receiving surface, actuating means disposed for operation to effect movement of said retractable portion relative to the fixed portion, actuating means disposed for operation to effect a predetermined movement of the regulating grinding wheel toward the fixed grinding wheel, time delay means connected to be responsive to the operation of said switching means and disposed for operation after a predetermined time interval to effect operation of said gauge and regulating wheel actuating means to thereby effect movement of the retractable portion of the gauge member to open the gauge member and pass a rod retained therein therethrough and to effect said predetermined movement of the regulating wheel toward the fixed grinding wheel, means responsive to said operation of each of said actuating means to effect a reverse operation thereof to return each of said actuating means to its initial position and move the retractable portion of said gauge member toward the fixed portion to reestablish the predetermined gauge size, and another switching means carried by said carriage disposed to be operated by a predetermined movement of the regulating wheel and guide discharge means, said another switching means being connected to control the operation of the carriage movement means to effect a predetermined movement of the carriage in response to the operation of said another switching means to thereby maintain the movable guide supporting member in alignment with the guide discharge means for receiving a ground rod therefrom.

10. The combination with a centerless grinding machine including a fixed grinding wheel and a movable regulating wheel for grinding rods and the like and having guide means at the discharge end of the machine disposed to be moved with the movable regulating wheel, means disposed to be actuated for effecting predetermined movement of the regulating wheel and the guide means in increments relative to the fixed grinding wheel, a movable carriage disposed adjacent said guide means, a tiltable guide supporting member carried by said carriage disposed to receive a ground rod as the rod is discharged from the guide means, means disposed to be actuated when the ground rod is carried by only said tiltable guide supporting member to tilt said guide member to discharge the rod therefrom, a work receiving surface on said carriage for receiving the rod discharged from said guide supporting member, switching means carried by said carriage and disposed in the path of movement of said rod to be actuated thereby to effect a switching operation as said rod is discharged from said guide supporting member, a gauge member carried by said carriage disposed to receive a portion of said rod when the rod is discharged from said guide supporting member, the gauge member having a predetermined gauge size and being disposed to retain the rod therein if said rod exceeds a predetermined diameter size or to pass the rod onto the work receiving surface if said rod does not exceed said predetermined diameter size, the gauge member having a fixed portion and a retractable portion disposed to be actuated to open the gauge member to pass a bar retained therein onto said work receiving surface, actuating means disposed for operation to effect movement of said retractable portion relative to the fixed portion, actuating means disposed for operation to effect a predetermined movement of the regulating grinding wheel toward the fixed grinding wheel, time delay means connected to be responsive to the operation of said switching means and disposed for operation after a predetermined time interval to effect operation of said gauge and regulating wheel actuating means to thereby effect movement of the retractable portion of the gauge member to open the gauge member and pass a rod retained therein therethrough and to effect said predetermined incremental movement of the regulating wheel toward the fixed grinding wheel, means disposed to be engaged by the rod as the rod passes through the gauge member for effecting an operation of the guide supporting actuating means to return the guide supporting member to its rod receiving position, and means responsive to said operation of each of said gauge and regulating wheel actuating means to effect a reverse operation thereof to return each of said actuating means to its initial position and move the retractable portion of said gauge member toward the fixed portion to reestablish the predetermined gauge size.

11. The combination with a centerless grinding machine including a fixed grinding wheel and a movable regulating wheel for grinding rods and the like and having guide means at the discharge end of the machine movable with the regulating wheel, means disposed to be actuated for effecting predetermined movement of the regulating wheel and guide discharge means in increments relative to the fixed grinding wheel, a movable carriage disposed adjacent said guide means, means disposed to be operated to effect a predetermined movement of said carriage in a predetermined direction, a tiltable guide supporting member carried by said carriage disposed to receive a ground rod as the rod is discharged from the guide means, means disposed to be actuated when the ground rod is carried by only said tiltable guide supporting member to tilt said guide member to discharge the rod therefrom, a work receiving surface on said carriage for receiving the rod discharged from said guide supporting member, switching means carried by said carriage and disposed in the path of movement of said rod to be actuated thereby to effect a switching operation as said rod is discharged from said guide supporting member, a gauge member carried by said carriage disposed to receive a portion of said rod when the rod is discharged from said guide supporting member, the gauge member having a predetermined gauge size and being disposed to retain the rod therein if said rod exceeds a predetermined diameter size or to pass the rod onto the work receiving surface if the rod does not exceed said predetermined diameter size, the gauge member having a fixed portion and a retractable portion disposed to be actuated to open the gauge to pass a bar retained therein onto said work receiving surface, actuating means disposed for operation to effect movement of said retractable portion relative to the fixed portion, actuating means disposed for operation to effect a predetermined movement of the regulating grinding wheel toward the fixed grinding wheel, time delay means connected to be responsive to the operation of said switching means and disposed for operation after a predetermined time interval to effect operation of said gauge and regulating wheel actuating means to thereby effect movement of the retractable portion of the gauge member to open the gauge member and pass a rod retained therein therethrough and to effect said predetermined incremental movement of the regulating wheel toward the fixed grinding wheel, means disposed to be engaged by the rod as the rod passes through the gauge member for effecting an operation of the guide supporting actuating means to return the guide supporting member to its rod receiving position, means responsive to said operation of each of said gauge and regulating wheel actuating means to effect a reverse operation thereof to return each of said actuating means to its initial position and move the retractable portion of said gauge member toward the fixed portion to reestablish the predetermined gauge size, and another switching means carried by said carriage disposed to be operated by a predetermined movement of the regulating wheel and guide discharge means, said another switching means being connected to control the operation of the carriage movement means when said another switching means is operated by said predetermined movement to effect a corresponding predetermined movement of said carriage to thereby maintain the movable guide supporting member in the rod receiving position in alignment with the guide discharge means for receiving a ground rod therefrom.

References Cited in the file of this patent

UNITED STATES PATENTS

| | | |
|---|---|---|
| 1,891,662 | Booth et al. | Dec. 20, 1932 |
| 1,993,830 | Conover | Mar. 12, 1935 |
| 2,486,950 | Jagen | Nov. 1, 1949 |
| 2,575,346 | Julian | Nov. 20, 1951 |
| 2,652,663 | Taylor | Sept. 22, 1953 |